US010686692B2

(12) United States Patent
Kosugi et al.

(10) Patent No.: US 10,686,692 B2
(45) Date of Patent: Jun. 16, 2020

(54) WIRELESS CONNECTION DEVICE

(71) Applicant: TAIYO YUDEN CO., LTD., Tokyo (JP)

(72) Inventors: Akifumi Kosugi, Tokyo (JP); Kazuo Asanuma, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 115 days.

(21) Appl. No.: 15/866,910

(22) Filed: Jan. 10, 2018

(65) Prior Publication Data

US 2018/0198701 A1    Jul. 12, 2018

(30) Foreign Application Priority Data

Jan. 11, 2017   (JP) .................................. 2017-002804

(51) Int. Cl.
| | |
|---|---|
| *H04L 12/733* | (2013.01) |
| *H04L 12/761* | (2013.01) |
| *H04L 12/751* | (2013.01) |
| *H04W 84/18* | (2009.01) |
| *H04W 40/02* | (2009.01) |
| *H04W 40/12* | (2009.01) |
| *H04L 12/721* | (2013.01) |
| *H04W 88/04* | (2009.01) |

(52) U.S. Cl.
CPC ............ *H04L 45/122* (2013.01); *H04L 45/02* (2013.01); *H04L 45/124* (2013.01); *H04L 45/16* (2013.01); *H04W 40/02* (2013.01); *H04W 40/12* (2013.01); *H04W 84/18* (2013.01); *H04W 88/04* (2013.01); *Y02D 70/30* (2018.01); *Y02D 70/34* (2018.01)

(58) Field of Classification Search
CPC ..... H04L 45/122; H04L 45/124; H04L 45/02; H04L 45/16; H04W 40/02; H04W 40/12; H04W 84/18; H04W 88/04; Y02D 70/34; Y02D 70/30
See application file for complete search history.

(56) References Cited

U.S. PATENT DOCUMENTS

| | | | |
|---|---|---|---|
| 2013/0223229 A1* | 8/2013 | Hui ....................... | H04W 40/02 370/238 |
| 2014/0213191 A1* | 7/2014 | Courtice ............... | H04W 40/12 455/67.11 |
| 2015/0249949 A1* | 9/2015 | Yanagi .................... | H04B 7/14 370/252 |

FOREIGN PATENT DOCUMENTS

JP          2010-166135 A          7/2010

* cited by examiner

*Primary Examiner* — Peter P Chau
(74) *Attorney, Agent, or Firm* — Chen Yoshimura LLP (57) ABSTRACT

A wireless connection device for establishing a connection path between a parent device and a child device through one more relay devices includes one or more processors that determines whether the signal strength between the child device and each of the relay devices is greater than or equal to a first threshold value; when the signal strength is determined to be greater than or equal to the first threshold value, selects, from among a plurality of possible communication paths for which the signal strength has been determined to be greater than or equal to the first threshold value, a communication path that minimizes a hop count; and, when the signal strength is less than the first threshold value for all of the plurality of possible communication paths, selects, from among the plurality of possible communication paths, a communication path that has the largest signal strength.

7 Claims, 10 Drawing Sheets

WIRELESS CONNECTION DEVICE

BACKGROUND OF THE INVENTION

Technical Field

The present invention relates to a wireless connection device.

Background Art

There are well-known techniques for reducing hop counts along communication paths in order to decrease signal transmission delay between wireless terminal devices and thereby reduce the total relay processing load across all wireless relay devices, for example (see Patent Document 1, for example).

RELATED ART DOCUMENT

Patent Document

Patent Document 1: Japanese Patent Application Laid-Open Publication No. 2010-166135

Multi-hop networks are networks in which signals are relayed between given wireless terminal devices (hereinafter, "first terminals") and final wireless terminal devices (hereinafter, "second terminals") using multiple hops via other wireless terminal devices (hereinafter, "third terminals").

In the technique disclosed in Patent Document 1, hop count is optimized when the hop count between first terminals and second terminals increases due to movement of the second terminals, for example, which are part of a multi-hop network. This hop count optimization is achieved by changing intermediary third terminals on the basis of the addresses of the first terminals and the addresses of the second terminals.

However, in the technique disclosed in Patent Document 1, hop count is optimized after allowing hop count on the multi-hop network to increase due to movement of the second terminals. In other words, optimizing hop count requires allowing the hop count to increase in the first place, which can potentially increase the processing load associated with the subsequent optimization.

SUMMARY OF THE INVENTION

Accordingly, the present invention is directed to a scheme that substantially obviates one or more of the problems due to limitations and disadvantages of the related art.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides a wireless connection device, including: a network interface that communicates with at least one of a first communication terminal, a second communication terminal, and one or more relay communication terminals that can be arranged between the first and second communication terminals; and one or more processors connected to the network interface, the one or more processors performs the following: receiving signal strength information indicating a signal strength between the second communication terminal and each of the first communication terminal and the one or more relay communication terminals; receiving hop count information indicating respective hop counts for a plurality of possible communication paths that can be formed between the first communication terminal and the second communication terminal through the one or more relay communication terminals or without any of the one or more relay communication terminals therebetween; determining whether the signal strength, as indicated by the received signal strength information, is greater than or equal to a first threshold value for each of the plurality of possible communication paths; when the signal strength is determined to be greater than or equal to the first threshold value, selecting, from among the plurality of possible communication paths for which the signal strength has been determined to be greater than or equal to the first threshold value, a communication path that minimizes the hop count, and, when the signal strength is less than the first threshold value for all of the plurality of possible communication paths, selecting, from among the plurality of possible communication paths, a communication path that has the largest signal strength; and causing the network interface to communicate with at least one of the first communication terminal, the second communication terminal, and one or more of the relay communication terminals that are on the selected communication path, if any, so as to establish the selected communication path between the first communication terminal and the second communication terminal.

In another aspect, the present disclosure provides a wireless connection determination method to be performed by one or more processors in a wireless connection device having a network interface and the one or more processors, the network interface being configured to communicate with at least one of a first communication terminal, a second communication terminal, and one or more relay communication terminals that can be arranged between the first and second communication terminals, the method including causing the one or more processors to perform the following: receiving signal strength information indicating a signal strength between the second communication terminal and each of the first communication terminal and the one or more relay communication terminals; receiving hop count information indicating respective hop counts for a plurality of possible communication paths that can be formed between the first communication terminal and the second communication terminal through the one or more relay communication terminals or without any of the one or more relay communication terminals therebetween; determining whether the signal strength, as indicated by the received signal strength information, is greater than or equal to a first threshold value for each of the plurality of possible communication paths; when the signal strength is determined to be greater than or equal to the first threshold value, selecting, from among the plurality of possible communication paths for which the signal strength has been determined to be greater than or equal to the first threshold value, a communication path that minimizes the hop count, and, when the signal strength is less than the first threshold value for all of the plurality of possible communication paths, selecting, from among the plurality of possible communication paths, a communication path that has the largest signal strength; and causing the network interface to communicate with at least one of the first communication terminal, the second communication terminal, and one or more of the relay communication terminals that are on the selected communication path, if any, so as to establish the selected communication path between the first communication terminal and the second communication terminal.

Other aspects of the present invention will become clear from the attached drawings and the descriptions in the present specification. It is to be understood that both the foregoing general description and the following detailed description are exemplary and explanatory, and are intended to provide further explanation of the invention as claimed.

The present invention makes it possible to quickly construct an optimal communication network without increasing hop count when a new communication terminal is added to an existing communication network.

DETAILED DESCRIPTION OF EMBODIMENTS

Disclosure of the present specification and the attached drawings will reveal at least the following items. In FIGS. 1 to 9, the same components will be described using the same reference characters.

Communication Network 100

Figure 1:
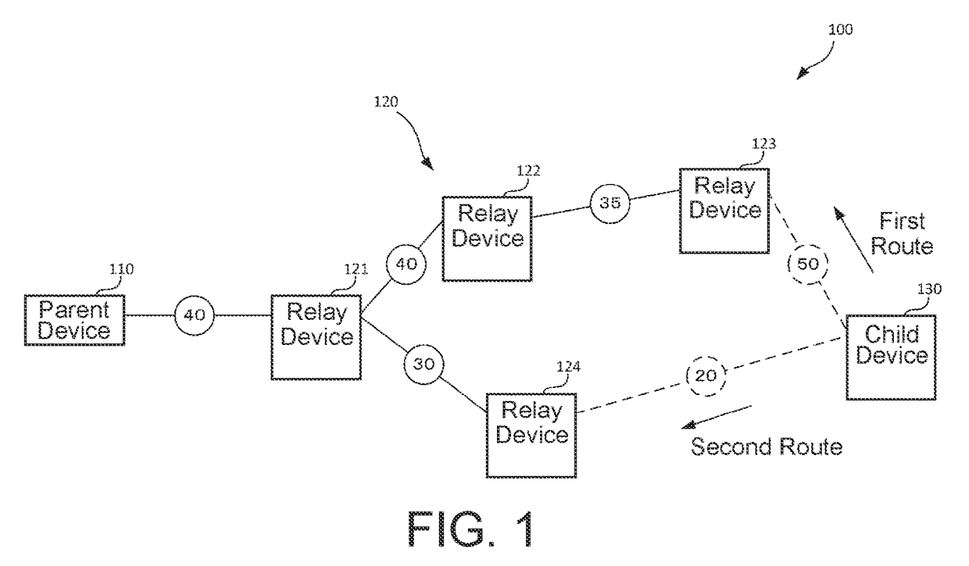
FIG. 1 is a network diagram illustrating an example of a state in which a final child device is placed within a communication network according to an embodiment.

A communication network 100 to which a wireless connection device 10 is applied will be described with reference to FIG. 1. FIG. 1 is a network diagram illustrating an example of a state in which a child device 130 is placed in the communication network 100 according to the present embodiment. Although in FIG. 1 the communication terminals are illustrated as being connected via solid lines for simplicity, in reality these communication terminals are connected wirelessly.

The communication network 100 according to the present embodiment is a multi-hop network, for example. Here, "multi-hop network" refers to a network in which communication terminals can communicate with one another directly or form communication paths going through other communication terminals.

As illustrated in FIG. 1, the communication network 100 of the present embodiment includes a communication terminal which broadcasts beacon information (hereinafter, a "parent device 110") and communication terminals (hereinafter, "relay devices 120") which communicate with the parent device 110 or other communication terminals in an ad hoc mode, for example. FIG. 1 illustrates a case where, in a state where the communication network 100 is formed with the parent device 110 and the relay devices 120, a new communication terminal (hereinafter, the "child device 130") joins the communication network 100. In FIG. 1, the relay devices 120 are illustrated as being constituted by relay devices 121 to 124. The beacon information includes, at least, identification information uniquely identifying each of the parent device 110, the relay devices 120, and the child device 130; connection information indicating the connection relationships between the devices; connection request signals and response signals (described later) used to connect the devices, and the like.

Here, "communication paths" refers to paths connecting together the parent device 110 and the child device 130 in a manner enabling communication therebetween, for example. These communication paths include paths on which signals are relayed between the parent device 110 and the child device 130 using the relay devices 120 as well as a path directly connecting together the parent device 110 and the child device 130.

In FIG. 1, the number "50" represents the signal strength between the child device 130 and the relay device 123, and the number "20" represents the signal strength between the child device 130 and the relay device 124. These numbers representing signal strength are enclosed within circles. Here, "signal strength" refers to the intensity of radio waves as calculated on the basis of electric field strength, and decibels relative to one milliwatt (dBm) is used as the unit of signal strength, for example.

When the signal strength between the communication terminals (the parent device 110, the relay devices 120, and the child device 130) is high, this facilitates high throughput. In other words, constructing the communication network 100 with high communication efficiency requires selecting the communication paths so as to achieve higher signal strength between the child device 130 and the relay devices 120 (or the parent device 110).

In FIG. 1, the hop count between the child device 130 and the parent device 110 along a first route is four, while the hop count along a second route is three. Here, "hop count" refers to the number of segments through which communication information travels on the way from the parent device 110 to the child device 130. Reducing the hop count of the communication path from the parent device 110 to the child device 130 makes it possible to reduce the information processing load on the relay devices 120. In other words, constructing the communication network 100 which has high communication efficiency requires selecting the communication path so as to reduce the number of the relay devices 120 through which communication information travels between the child device 130 and the parent device 110.

Thus, as described above, constructing the communication network 100 which has high communication efficiency requires considering the signal strength between the child device 130 and the relay devices 120 (or the parent device 110), and the hop count between the child device 130 and the parent device 110.

The wireless connection device 10 according to the present embodiment performs determinations based on signal strength and hop count in order to construct the communication network 100 to have high communication efficiency.

Wireless Connection Device 10

Figure 2:
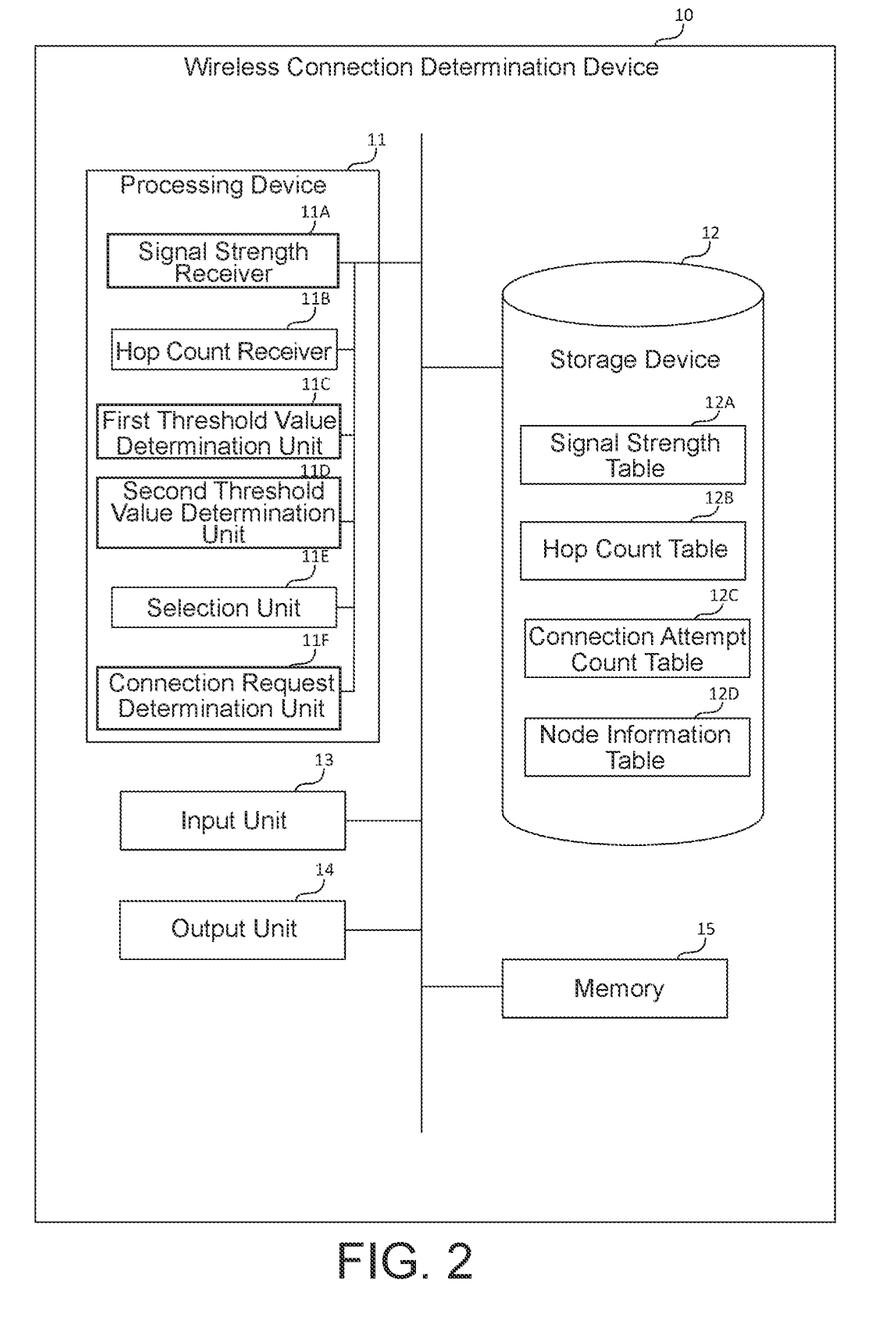
FIG. 2 is a block diagram illustrating an example configuration of a wireless connection device according to the embodiment.
Figure 3:
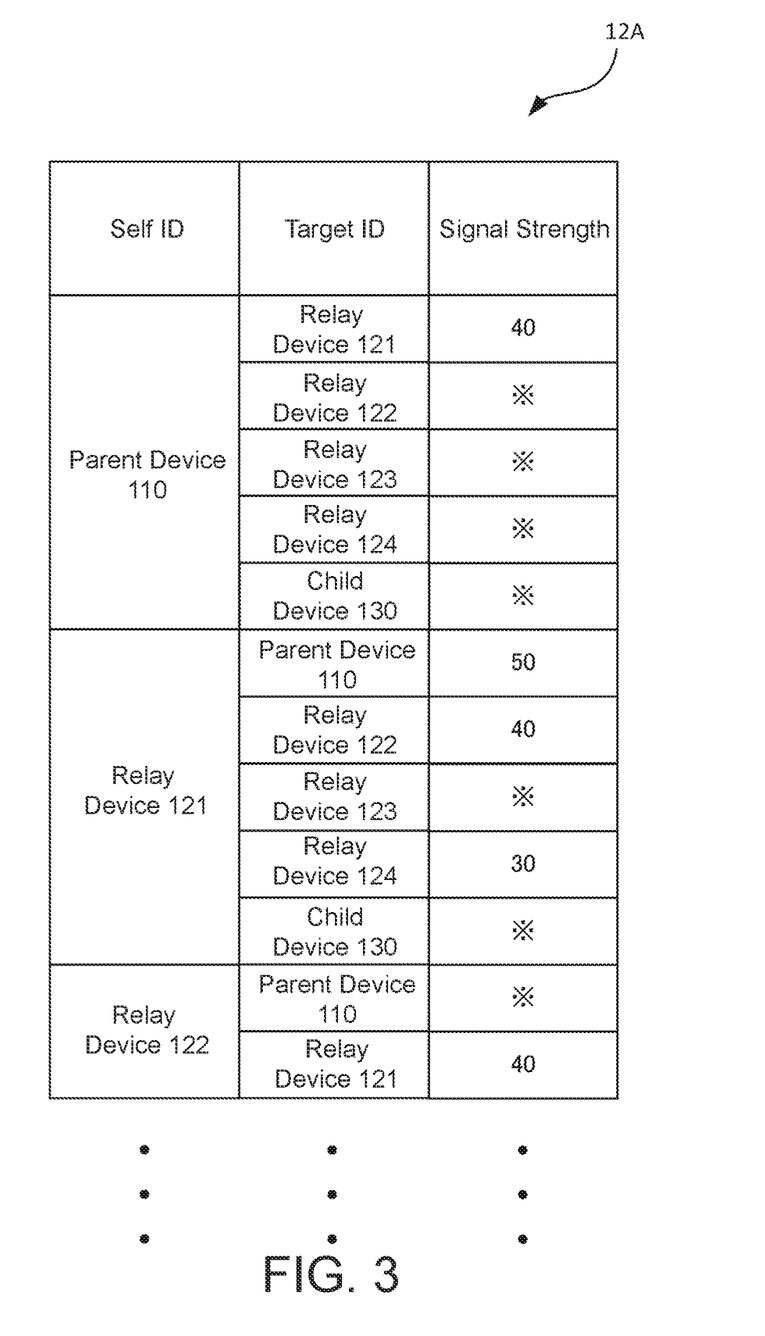
FIG. 3 illustrates an example of a signal strength table according to the embodiment.
Figure 4:
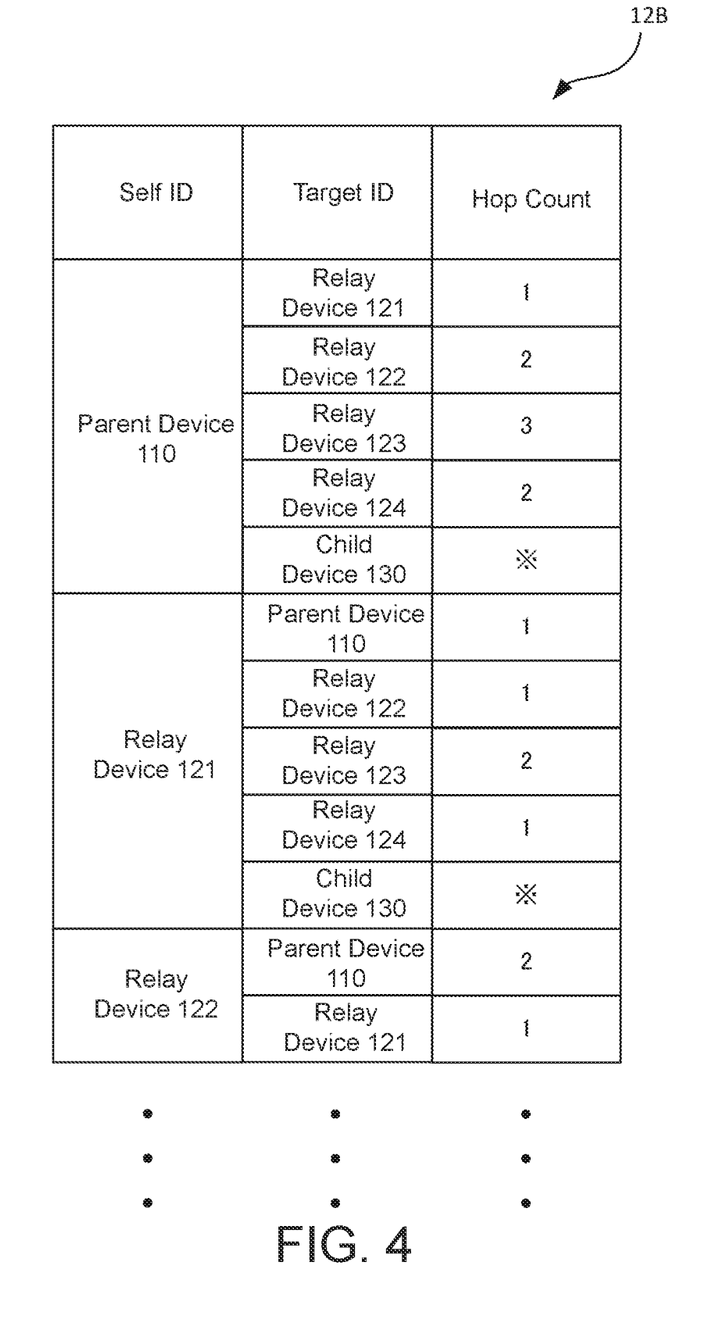
FIG. 4 illustrates an example of a hop count table according to the embodiment.
Figure 5:
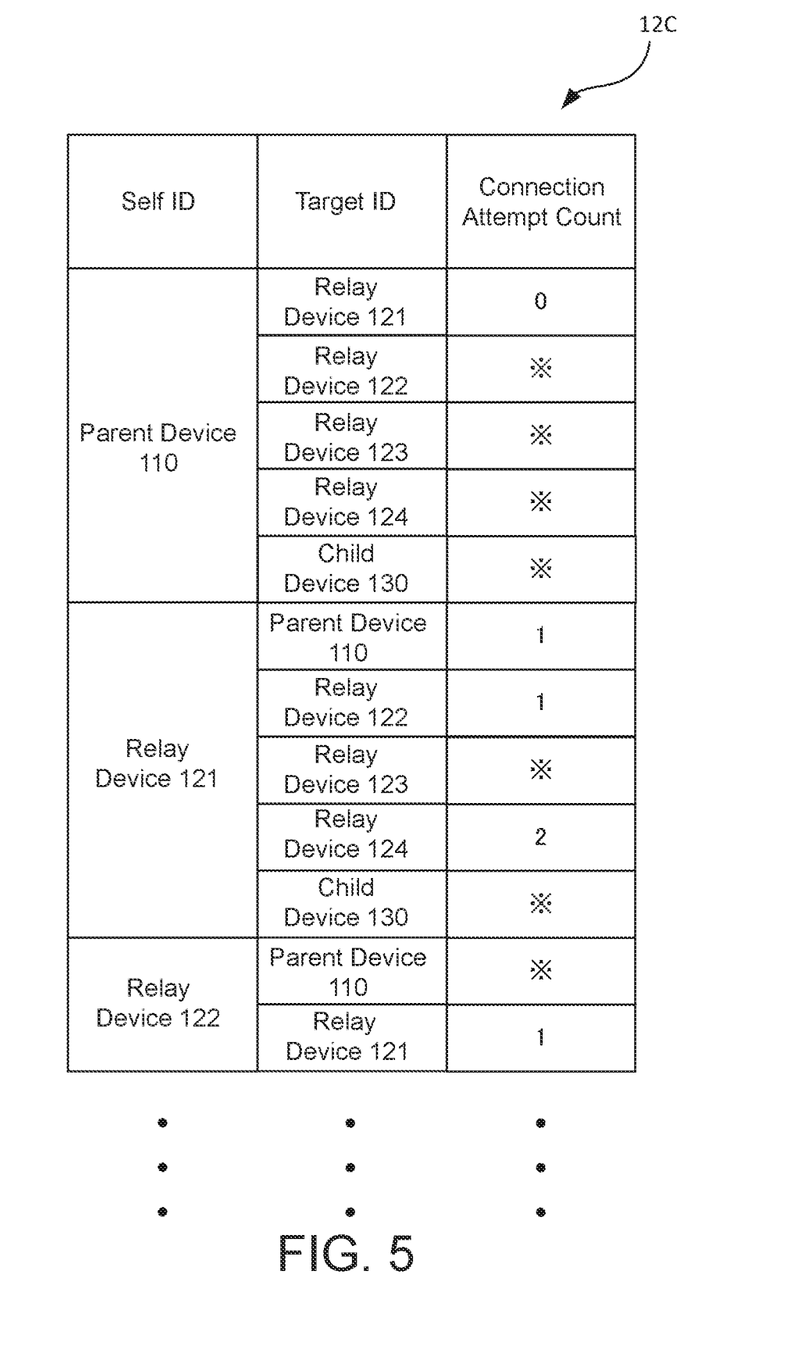
FIG. 5 illustrates an example of a connection attempt count table according to the embodiment.
Figure 6:
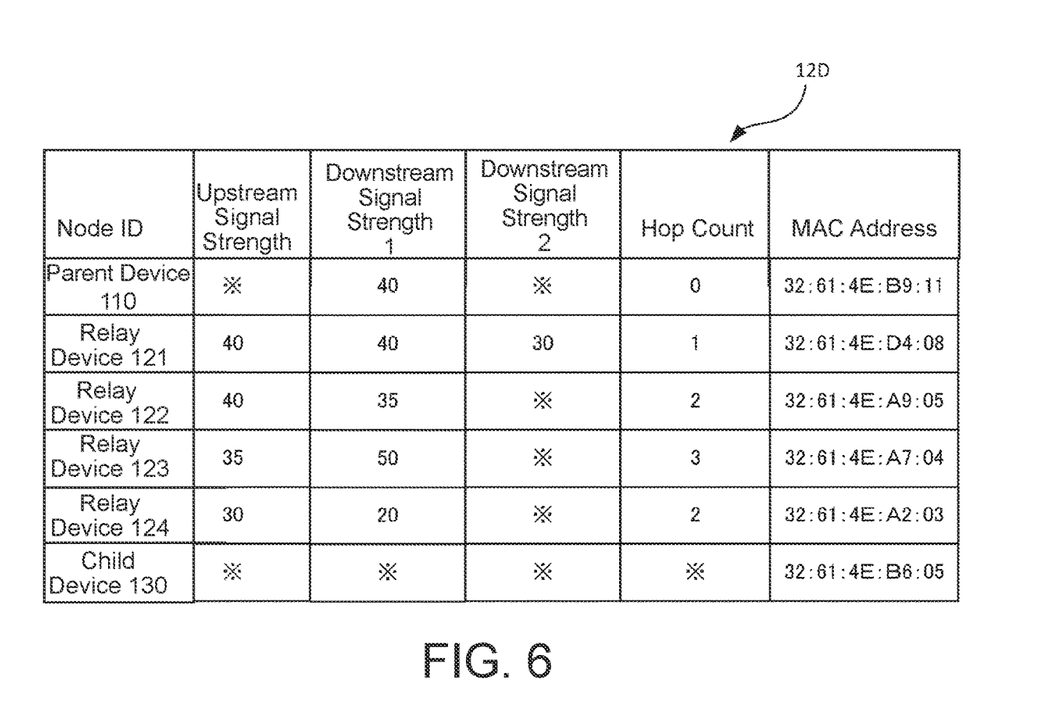
FIG. 6 illustrates an example of a node information table according to the embodiment.

Next, the wireless connection device 10 according to the present embodiment will be described with reference to FIGS. 1 to 6. FIG. 2 is a block diagram illustrating an example configuration of the wireless connection device 10 according to the present embodiment. FIG. 3 illustrates an example of a signal strength table 12A according to the present embodiment. FIG. 4 illustrates an example of a hop count table 12B according to the present embodiment. FIG. 5 illustrates an example of a connection attempt count table 12C according to the present embodiment. FIG. 6 illustrates an example of a node information table 12D according to the present embodiment.

The wireless connection device 10 is a device connected to the parent device 110, the relay devices 120, and the child device 130 in a manner enabling communication therebetween, for example. However, the wireless connection device 10 is not limited in terms of whether configured to be installed within the parent device 110, the relay devices 120, and the child device 130 or configured as a separate device that can respectively communicate with the parent device 110, the relay devices 120, and the child device 130. The following description assumes a case in which the wireless connection device 10 is configured to be installed within each of the parent device 110, the relay devices 120, and the child device 130.

The wireless connection device 10 has a feature for determining which of the relay devices 120 (or the parent device 110) the child device 130 should connect to upon joining the existing communication network 100 in order to construct the new communication network 100 to have high communication efficiency. This wireless connection device 10 includes a processing device 11, a storage device 12, an input unit 13, an output unit 14, and a memory 15, for example.

The processing device 11 and the storage device 12 will be described in more detail later.

The input unit 13 is a network interface to which information from the communication terminal connected to the wireless connection device 10 is input, for example. The output unit 14 is a network interface which outputs information to the communication terminal connected to the wireless connection device 10, for example. The memory 15 is a device which stores programs to be executed by the processing device 11, for example. The memory 15 is constituted by a hard disk drive, an SSD, an optical storage device, or the like, for example.

Processing Device 11

Next, the processing device 11 will be described in detail with reference to FIGS. 1 and 2.

The processing device 11 is constituted by a CPU, an MPU, or the like, for example. The processing device 11 (processor) achieves various functionalities by reading programs stored in the memory 15. Here, the processing device 11 includes a signal strength receiver 11A, a hop count receiver 11B, a first threshold value determination unit 11C, a second threshold value determination unit 11D, a selection unit 11E, and a connection request determination unit 11F. Although these elements are named as if they are separate physical units, actually, these elements 11A to 11E are processes performed by the processing device 11, which may be constructed by one or more processors, by receiving data representing corresponding information or signals.

Signal Strength Receiver 11A

The signal strength receiver 11A has a feature for receiving signal strength information indicating signal strength between the child device 130 and the relay devices 120. The parent device 110, the relay devices 120, and the child device 130 measure signal strength with each of the other devices. The signal strength receiver 11A receives the signal strengths measured by the parent device 110, the relay devices 120, and the child device 130 as signal strength information. The signal strength receiver 11A adds connection information indicating which communication terminals the signal strength information was measured between to the signal strength information and then outputs the resulting information to the storage device 12. This makes it possible for the wireless connection device 10 to use the signal strength information in determinations (described later).

Hop Count Receiver 11B

The hop count receiver 11B has a feature for receiving hop count information indicating the hop count between the child device 130 and the parent device 110. The parent device 110 sends beacon information to the relay devices 120 and the child device 130. The relay devices 120 and the child device 130 that receive the beacon information then send beacon information back to the parent device 110 to notify the parent device 110 that the relay devices 120 and the child device 130 are available for connection, respectively. The parent device 110, the relay devices 120, and the child device 130 track the communication paths along which the beacon information travels and also identify the hop counts associated with those communication paths. The hop count receiver 11B receives the hop counts identified by the parent device 110, the relay devices 120, and the child device 130 as hop count information. The hop count receiver 11B then outputs this hop count information to the storage device 12. This makes it possible for the wireless connection device 10 to use the hop count information in determinations (described later).

First Threshold Value Determination Unit 11C

The first threshold value determination unit 11C has a feature for determining whether the signal strength information is greater than or equal to a first threshold value related to a predetermined signal strength value. It is preferable that the first threshold value be set to a signal strength value at which a communication connection can be reliably established between the child device 130 and the relay devices 120. The first threshold value determination unit 11C outputs information (hereinafter, "first determination information") indicating the result of the determination of whether the signal strength information is greater than or equal to the first threshold value or less than the first threshold value to the second threshold value determination unit 11D or the selection unit 11E. The first threshold value can be set to any value.

Second Threshold Value Determination Unit 11D

The second threshold value determination unit 11D has a feature for, when the first threshold value determination unit 11C determines that the signal strength information is less than the first threshold value, determining whether the signal strength information is greater than or equal to a second threshold value related to a predetermined signal strength value. It is preferable that the second threshold value be set to a value which is less than the first threshold value and correspond to the minimum signal strength value at which the child device 130 and the relay devices 120 can communicate in a stable manner. The second threshold value determination unit 11D outputs information (hereinafter, "second determination information") indicating the result of the determination of whether the signal strength information is greater than or equal to the second threshold value or less than the second threshold value to the selection unit 11E. The second threshold value can be set to any value.

Selection Unit 11E

The selection unit 11E has a feature for selecting the optimal communication path on the basis of the first determination information and the second determination information. Upon receiving first determination information indicating that the signal strength information is greater than or equal to the first threshold value, the selection unit 11E selects a communication path so as to minimize the hop count. Moreover, upon receiving second determination information indicating that the signal strength information is greater than or equal to the second threshold value, the selection unit 11E selects a communication path so as to maximize the signal strength between the relay devices 120 and the child device 130. A specific method of making these selections will be described in more detail later in the "Determination Procedure" section.

Connection Request Determination Unit 11F

The connection request determination unit 11F has features for sending connection requests to the relay devices 120 on the communication path selected by the selection unit 11E and determining whether communications between the communication terminals are in a maintainable state. Note that the following description assumes that during selection of the communication path, the relay device 123 was selected from among the relay devices 120.

The connection request determination unit 11F outputs a connection request signal requesting a communication connection to the relay device 123. The connection request signal is a signal included within beacon information, for example. The connection request determination unit 11F then determines whether a response signal indicating the response from the relay device 123 to the connection request signal is successfully received within a prescribed period of time. The response signal is a signal included within beacon information, for example. If the response signal is successfully received within the prescribed period of time, the connection request determination unit 11F initiates communication between the child device 130 and the relay device 123. If the response signal is not successfully received within the prescribed period of time, the connection request determination unit 11F outputs another connection request signal to the relay device 123. The connection request determination unit 11F counts this number of times a connection request signal is output (hereinafter, "connection attempt count"). If a response signal is not successfully received even after the connection attempt count exceeds a prescribed number of attempts, the connection request determination unit 11F determines that communications are not possible and stops outputting connection request signals. In this case, the connection request determination unit 11F then re-searches for relay devices 120 other than the relay device 123. In this type of situation in which a response signal is not successfully received, it is possible that the relay device 123 is saturated with connections from other communication terminals. Thus, establishing a communication path going through the connection-saturated relay device 123 could cause the communication network 100 to become unstable. The connection request determination unit 11F therefore performs determinations to avoid these types of situations. A specific method of making these determinations will be described in more detail later in the "Determination Procedure" section.

Storage Device 12

Next, the storage device 12 will be described in detail with reference to FIGS. 3 to 6.

The storage device 12 is a device which stores programs and various types of information. The storage device 12 is constituted by ROM, RAM, flash memory, or the like. The storage device 12 stores the signal strength table 12A, the hop count table 12B, the connection attempt count table 12C, and the node information table 12D, for example.

Signal Strength Table 12A

Next, the signal strength table 12A will be described in detail with reference to FIG. 3. The signal strength table 12A is a table indicating signal strength between each of the communication terminals. The numerical values given in the signal strength table 12A in FIG. 3 are example values corresponding to the communication network 100 illustrated in FIG. 1. Also note that the numerical values shown in FIG. 1 indicate the signal strength at the time of transmission from an upstream communication terminal to a downstream communication terminal. The signal strength table 12A stores, in an associated manner, a "Self ID" field indicating the communication terminal that sends communication information, a "Target ID" field indicating the communication terminal that receives that communication information, and a "Signal Strength" field indicating the signal strength between those communication terminals, for example. Here, the signal strength when transmitting from the parent device 110 to the relay device 121 is 40. The signal strength when transmitting from the relay device 121 to the parent device 110 is 50. The signal strength when transmitting from the relay device 121 to the relay device 122 is 40. The signal strength between all of the communication terminals present on the communication network 100 is similarly represented in this manner. Note that in FIG. 3, the symbol indicates cases in which the signal strength is not received, such as when the distance between the communication terminals is large or when an obstruction is present between the communication terminals. Moreover, the format of the signal strength table 12A shown here is only an example, and any database format that can be referenced by the processing device 11 may be used.

Hop Count Table 12B

Next, the hop count table 12B will be described in detail with reference to FIG. 4. The hop count table 12B is a table indicating the hop counts between each of the communication terminals. Note that the numerical values given in the hop count table 12B in FIG. 4 are example values corresponding to the communication network 100 illustrated in FIG. 1. The hop count table 12B stores, for example, a "Self ID" field indicating the communication terminal that sends communication information, a "Target ID" field indicating the communication terminal that receives that communication information, and a "Hop Count" field indicating the hop count between those communication terminals so as to correspond to each other. Here, the hop count between the parent device 110 and the relay device 124 is 2. The hop count between the relay device 121 and the relay device 124 is 1. Note that in FIG. 4, the ✕ symbol indicates cases in which the signal strength is not received, such as when the distance between the communication terminals is large or when an obstruction is present between the communication terminals. The format of the hop count table 12B shown here is only an example, and any database format that can be referenced by the processing device 11 may be used.

Connection Attempt Count Table 12C

Next, the connection attempt count table 12C will be described in detail with reference to FIG. 5. The connection attempt count table 12C is a table indicating the number of connection attempts between each of the communication terminals. Note that the numerical values given in the connection attempt count table 12C in FIG. 5 are example values corresponding to the communication network 100 illustrated in FIG. 1. The connection attempt count table 12C stores, for example, a "Self ID" field indicating the communication terminal that sends communication information, a "Target ID" field indicating the communication terminal that receives that communication information, and a "Connection Attempt Count" field indicating the connection attempt count between those communication terminals so as to correspond to each other. Here, the connection attempt count between the parent device 110 and the relay device 121 is 0. The connection attempt count between the relay device 121 and the relay device 122 is 1. Higher connection attempt counts indicate that it is more difficult to establish a communication connection between the respective communication terminals. Note that in FIG. 5, the ✗ symbol indicates cases in which the signal strength is not received, such as when the distance between the communication terminals is large or when an obstruction is present between the communication terminals. Moreover, the format of the connection attempt count table 12C shown here is only an example, and any database format that can be referenced by the processing device 11 may be used.

Node Information Table 12D

Next, the node information table 12D will be described in detail with reference to FIG. 6. The node information table 12D is a table indicating various types of information about each of the communication terminals connected to the communication network 100. Note that the numerical values given in the node information table 12D in FIG. 6 are example values for the communication terminals in the communication network 100 illustrated in FIG. 1. The processing device 11 references the node information table 12D to select communication paths. The node information table 12D stores, in an associated manner, a "Node ID" field indicating each of the communication terminals, an "Upstream Signal Strength" field indicating the signal strength on the upstream side (the parent device 110 side) of each of the communication terminals, a "Downstream Signal Strength 1" field indicating the signal strength on the downstream side (the child device 130 side) of each of the communication terminals, a "Downstream Signal Strength 2" field for when there are multiple communication terminals on the downstream side, a "Hop Count" field indicating the hop count to the parent device 110, and a "MAC address" field indicating the MAC address of each of the communication terminals. Note that the format of the node information table 12D shown here is only an example, and any database format that can be referenced by the processing device 11 may be used. Moreover, the fields stored in the node information table 12D are not limited, and these fields can be changed as necessary.

Determination Procedure

Figure 7A:
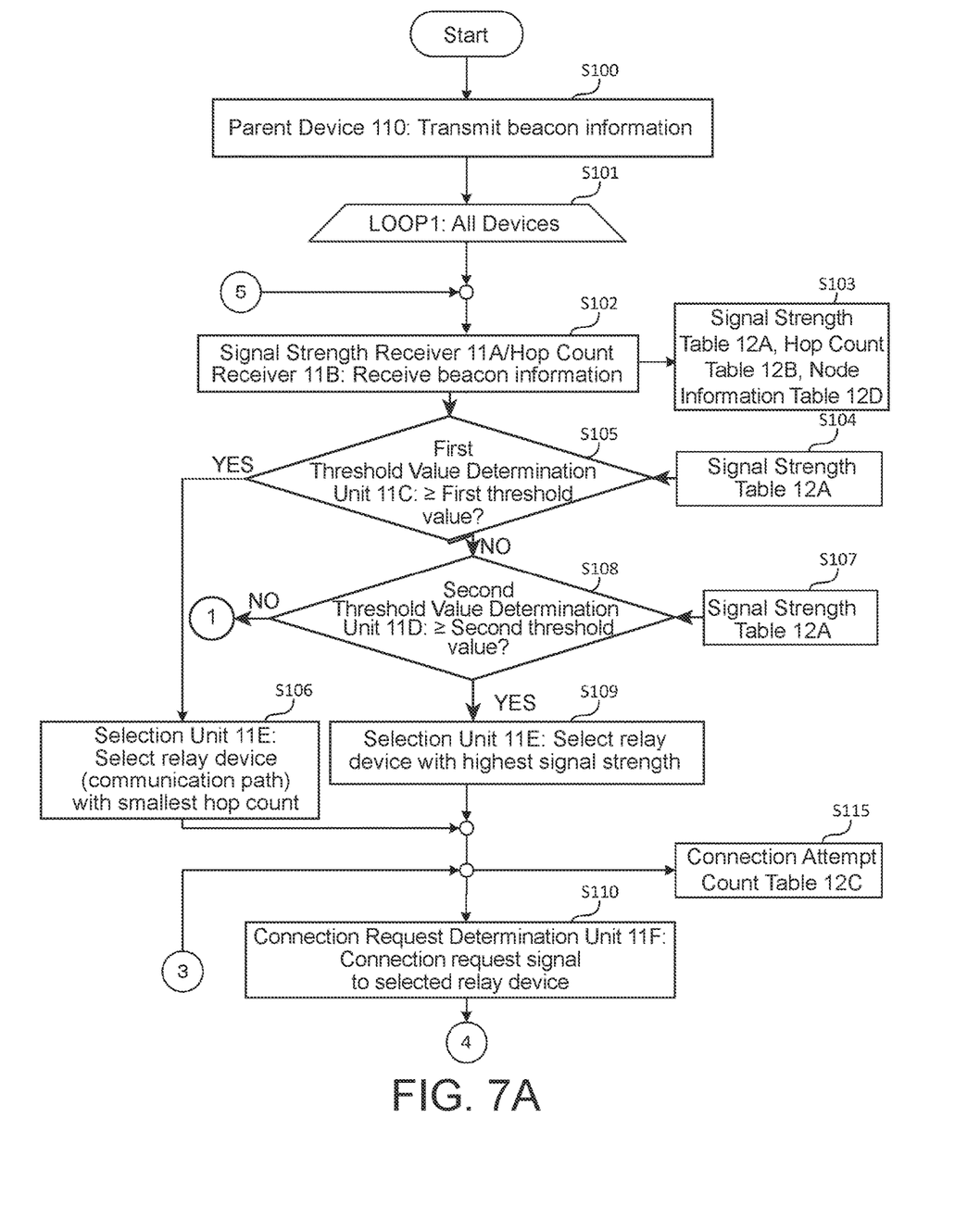
FIG. 7A is a flowchart illustrating an example of a determination procedure of the wireless connection device according to the embodiment.
Figure 7B:
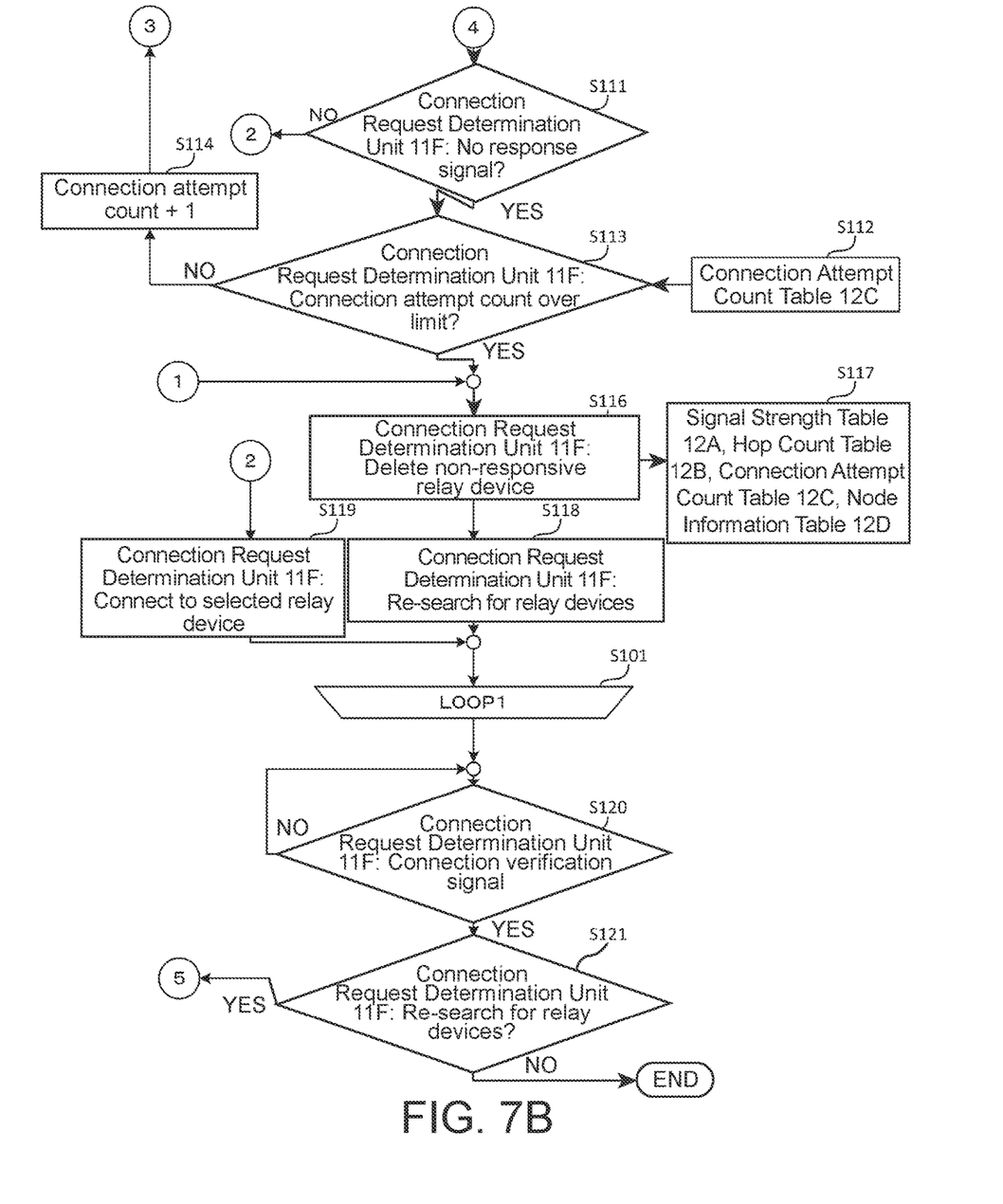
FIG. 7B is a flowchart illustrating the example of the determination procedure of the wireless connection device according to the embodiment.
Figure 8:
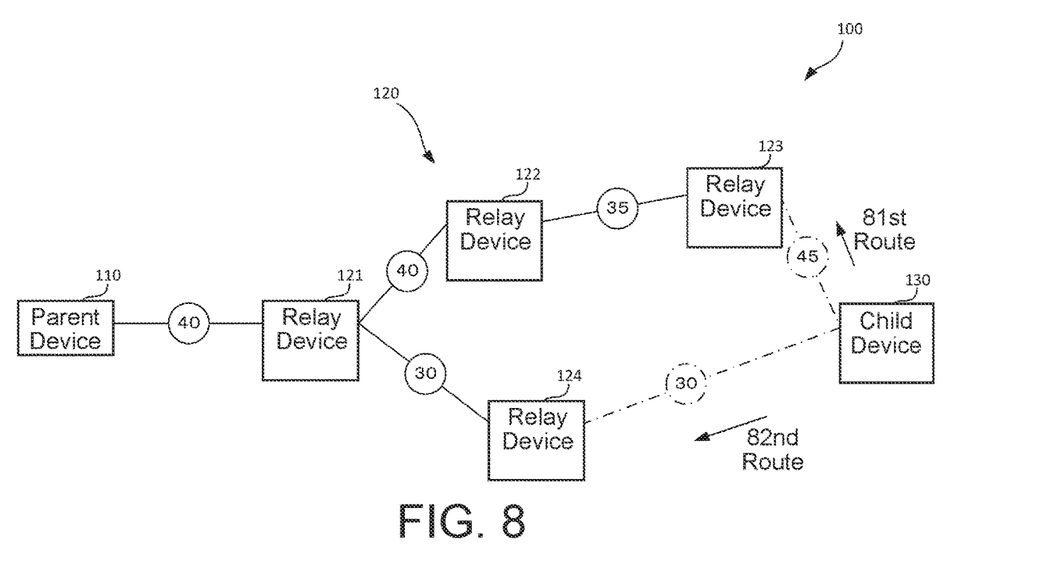
FIG. 8 is a network diagram illustrating an example determination state of a first threshold value determination unit of the wireless connection device according to the embodiment.
Figure 9:
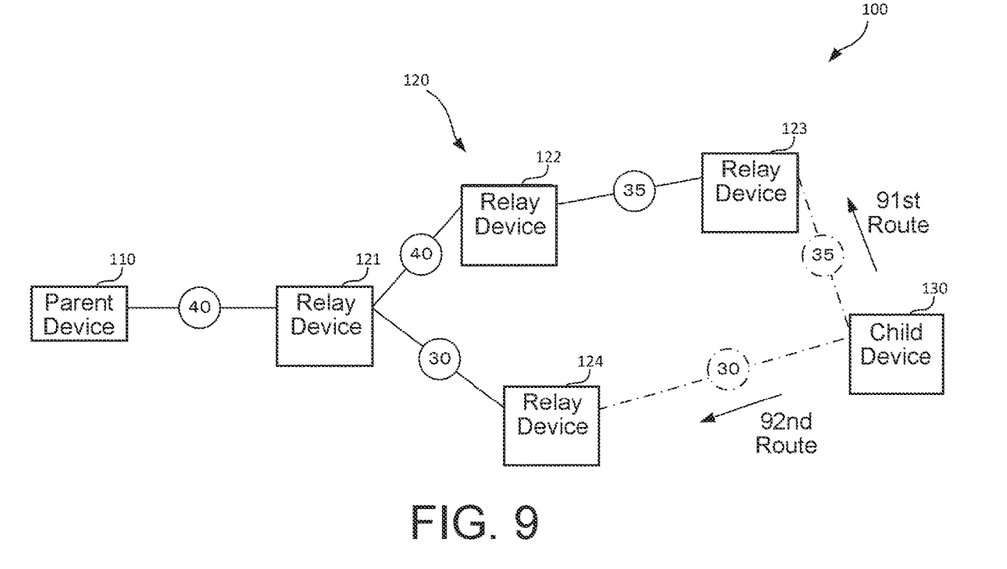
FIG. 9 is a network diagram illustrating an example determination state of a second threshold value determination unit of the wireless connection device according to the embodiment.

Next, a determination procedure of the wireless connection device 10 will be described with reference to FIGS. 7A and 7B and FIGS. 8 and 9. FIGS. 7A and 7B are flowcharts illustrating an example of the determination procedure of the wireless connection device 10 according to the present embodiment. FIG. 8 is a network diagram illustrating an example determination state of the first threshold value determination unit 11C of the wireless connection device 10 according to the present embodiment. FIG. 9 is a network diagram illustrating an example determination state of the second threshold value determination unit 11D of the wireless connection device 10 according to the present embodiment. The determination procedure illustrated in FIGS. 7A and 7B is implemented in the form of execution of various programs by the processing device 11 of the wireless connection device 10.

First, the parent device 110 is powered ON either remotely or directly. As illustrated in FIGS. 7A and 7B, the parent device 110 then boots up and begins broadcasting beacon information (S100). The relay devices 120 that receive the beacon information are respectively connected so as to form the optimal communication network 100. The description below focuses on the determination procedure in a situation where, starting from a state in which the relay devices 120 are respectively connected, the child device 130 connects to the communication network 100.

In the child device 130, the wireless connection device 10 (the signal strength receiver 11A and the hop count receiver 11B) receives beacon information (S102). The wireless connection device 10 then stores signal strength information, hop count information, and MAC address information from this beacon information into the signal strength table 12A, the hop count table 12B, and the node information table 12D (S103).

Next, starting from this state, determinations and selections performed by the first threshold value determination unit 11C and the selection unit 11E will be described in detail with reference to FIGS. 8 and 9.

The first threshold value determination unit 11C references the signal strength table 12A to check the signal strengths between the child device 130 and the relay devices 120 (and the parent device 110) (S104). The first threshold value determination unit 11C then determines whether the signal strengths between the child device 130 and the relay devices 120 (and the parent device 110) are greater than or equal to the first threshold value (S105). The first threshold value determination unit 11C outputs first determination information to the selection unit 11E. The selection unit 11E then, on the basis of the first determination information, selects a relay device 120 so as to maximize communication efficiency. More specifically, if the first threshold value is set to 40 in the communication network 100 illustrated in FIG. 8, the first threshold value determination unit 11C determines that the signal strength of 45 between the child device 130 and the relay device 123 is greater than or equal to the first threshold value (YES in S105). In this case, the selection unit 11E selects the relay device 123 so as to minimize the hop count (S106). This is because communication efficiency improves as hop count becomes increasingly small. In other words, the selection unit 11E selects the communication path corresponding to an 81st route.

Meanwhile, if the first threshold value is set to 40 in the communication network 100 illustrated in FIG. 9, the first threshold value determination unit 11C determines that the signal strength of 35 between the child device 130 and the relay device 123 and the signal strength of 30 between the child device 130 and the relay device 124 are both less than the first threshold value (NO in S105). The first threshold value determination unit 11C therefore outputs the first determination information to the second threshold value determination unit 11D, and the process transitions to a determination performed by the second threshold value determination unit 11D. The second threshold value determination unit 11D references the signal strength table 12A to check the signal strengths between the child device 130 and the relay devices 120 (and the parent device 110) (S107). The second threshold value determination unit 11D then determines whether the signal strengths between the child device 130 and the relay devices 120 are greater than or equal to the second threshold value (S108). The second threshold value determination unit 11D outputs second determination information to the selection unit 11E. The selection unit 11E then, on the basis of the second determination information, selects a relay device 120 so as to maximize communication efficiency. More specifically, if the second threshold value is set to 30 in FIG. 9, the second threshold value determination unit 11D determines that the signal strength of 35 between the child device 130 and the relay device 123 and the signal strength of 30 between the child device 130 and the relay device 124 are both greater than or equal to the second threshold value (YES in S108). In this case, the selection unit 11E then selects the relay device 123 so as to maximize the signal strength between the child device 130 and the relay devices 120 (S109). This is because communication efficiency improves as signal strength becomes increasingly large. In other words, the selection unit 11E selects the communication path corresponding to a 91st route.

Next, a procedure by which the connection request determination unit 11F determines the connection attempt count for the relay device 123 selected as an example in S102 to S109 will be described.

The connection request determination unit 11F outputs a connection request signal to the relay device 123 selected by the selection unit 11E (S110). The connection request determination unit 11F then determines whether a response signal from the relay device 123 to this connection request signal is input (S111). This determination makes it possible to detect decreased communication processing availability of the relay device 123, which can occur when the relay device 123 is saturated with connections from the other communication terminals.

If a response signal from the relay device 123 is input (NO in S111), it is determined that the communication state between the relay device 123 and the child device 130 is good, and the relay device 123 and the child device 130 are connected (S119). If no response signal from the relay device 123 is input (YES in S111), it is determined that the communication state between the relay device 123 and the child device 130 is not good. The child device 130 (which originally output the connection request signal) references retransmission control information, for example, and outputs another connection request signal to the relay device 123. Here, "retransmission control information" refers to information for verifying whether connection request signals arrive at the relay device 123, for example. The connection request determination unit 11F increments the connection attempt count each time such a connection request signal is output (S114) and stores the connection attempt count in the connection attempt count table 12C (S115). If, while S110 to S115 are then repeated, a response signal from the relay device 123 is input, the relay device 123 and the child device 130 are connected (NO in S111).

Meanwhile, if, as a result of repeating S110 to S115, the connection attempt count exceeds a prescribed number of attempts, the connection request determination unit 11F stops outputting connection request signals to the selected relay device 123. In this case, the connection request determination unit 11F deletes the relay device 123 from the tables so that the relay device 123 is no longer found when re-searching for the relay devices 120 (S116, S117). The connection request determination unit then re-searches for the relay devices 120 other than the relay device 123 that are available for connection (S118). In other words, S102 to S115 are repeated to search for the relay devices 120 that are available for communication.

The procedure of S102 to S119 is repeated in this manner for all of the communication terminals to form the optimal communication network 100 (S101). Note that although the description above focused on a situation in which the child device 130 joins the communication network 100, the same determination processes are also performed as each of the relay devices 120 is connected.

Next, a determination procedure for when the connection responsiveness between certain communication terminals decreases after forming the optimal communication network 100 will be described. Note that for simplicity, the following description focuses on a situation in which connection responsiveness decreases between the child device 130 and the relay device 123 selected by the selection unit 11E.

After the communication network 100 is formed, the child device 130 and the relay device 123 continuously exchange connection verification signals for verifying the communication state therebetween. These connection verification signals are signals included within beacon information, for example. If an obstacle becomes present between the child device 130 and the relay device 123, this exchange of connection verification signals is no longer possible. To detect such situations, the connection request determination unit 11F determines the communication state of the connection verification signals (S120). In one method of determining communication state, for example, the child device 130 transmits a connection verification signal to the relay device 123, and if the relay device 123 successfully receives this connection verification signal, the relay device 123 transmits a connection verification signal back to the child device 130. If the relay device 123 does not successfully receive the connection verification signal, the child device 130 re-transmits the connection verification signal to the relay device 123 at a prescribed time interval. If the child device 130 does not successfully receive a connection verification signal from the relay device 123 even after a prescribed number of attempts, the connection request determination unit 11F determines that communication between the child device 130 and the relay device 123 is no longer possible (YES in S120). In this case, the connection request determination unit 11F searches for other relay devices 120 that can communicate with the child device 130 (YES in S121). The connection request determination unit 11F then repeats S102 to S119 to search for the relay devices 120. If it is not necessary to perform this search, the determination process is ended (NO in S121). In this way, even if an obstacle appears on the communication path after the communication network 100 is formed, it is possible to re-form the optimal communication network 100.

Note that the embodiment described above was presented only to facilitate understanding of the present invention and should not be interpreted to limit the present invention in any way. The present invention can be modified and improved within the spirit of the invention, and such equivalent configurations are also included within the present invention. For example, the configurations described below are also included.

Other Embodiments

Communication Network 100

Although the communication network 100 was described as being a multi-hop network in the embodiment above, the present invention is not limited to this configuration. For example, the parent device 110 may communicate with the relay devices 120 and the child device 130 in a one-way manner.

It is preferable that the communication network 100 in the embodiment described above be a network formed by communication terminals arranged on each unit of a solar power generation system.

Processing Device 11

Although the processing device 11 was described as including the second threshold value determination unit 11D in the embodiment above, the present invention is not limited to this configuration. For example, the processing device 11 may be configured to not include a second threshold value determination unit 11D. In this case, in the processing device 11, the first threshold value determination unit 11C determines whether the signal strengths between the relay devices 120 and the child device 130 are greater than or equal to the first threshold value, and if the signal strengths are greater than or equal to the first threshold value, the selection unit 11E selects a communication path so as to minimize the hop count of the communication path. If the signal strengths are less than the first threshold value, the communication path is selected so as to maximize the signal strength. This makes it possible to avoid a temporary increase in hop count when the child device 130 joins the communication network 100.

Although the processing device 11 was described as including the connection request determination unit 11F in the embodiment above, the present invention is not limited to this configuration. For example, the processing device 11 may be configured to not include a connection request determination unit 11F. Even in this case, the processing device 11 can utilize the first threshold value determination unit 11C, the second threshold value determination unit 11D, and the selection unit 11E to select a communication path on the basis of hop count or signal strength, and therefore it is still possible to avoid a temporary increase in hop count when the child device 130 joins the communication network 100.

SUMMARY

As described above, the wireless connection device 10 according to the present embodiments includes: the signal strength receiver 11A which, among the parent device 110 (a first communication terminal), the child device 130 (a second communication terminal), and the relay devices 120 (third communication terminals) for enabling communication between the parent device 110 and the child device 130, receives signal strength information indicating a signal strength value between the child device 130 and at least one of the parent device 110 and the relay devices 120; the hop count receiver 11B which receives hop count information indicating respective hop counts for a plurality of communication paths formed between the parent device 110 and the child device; the first threshold value determination unit 11C which determines whether the signal strength is greater than or equal to a first threshold value; and the selection unit 11E which, when the signal strength is greater than or equal to the first threshold value, selects from among the plurality of communication paths a communication path that minimizes hop count, and, when the signal strength is less than the first threshold value, selects from among the plurality of communication paths a communication path that maximizes signal strength. The present embodiments thus make it possible to select a communication path without increasing hop count when the child device 130 joins the communication network 100, thereby making it possible to quickly form the optimal communication network 100.

Moreover, the wireless connection device 10 according to the present embodiments may further include: the second threshold value determination unit 11D which, when the signal strength is less than the first threshold value, determines whether the signal strength is greater than or equal to a second threshold value which is less than the first threshold value, wherein when the signal strength is less than the first threshold value and greater than or equal to the second threshold value, the selection unit 11E selects from among the plurality of communication paths a communication path that maximizes signal strength. Thus, when the signal strength is between the first threshold value and the second threshold value, the present embodiments make it possible to select a communication path with high signal strength so as to form the communication network 100 to be more stable.

Furthermore, the wireless connection device 10 according to the present embodiments may further include the connection request determination unit 11F, which transmits a connection request from the child device 130 to the parent device 110 or to the relay child device 120 on the communication path selected by the selection unit 11E, re-transmits the connection request if there is no response to the connection request within a prescribed period of time, and stops transmitting the connection request when a number of times the connection request has been transmitted becomes greater than or equal to a prescribed number of times. Thus, when the child device 130 joins the communication network 100, the present embodiments make it possible to detect situations in which the relay device 120 to be connected is saturated with connections from other communication terminals, situations in which communication interruptions may occur due to differences in upstream and downstream signal strengths for wireless communications, and the like, thereby making it possible to avoid reductions in communication efficiency.

It will be apparent to those skilled in the art that various modifications and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. A wireless connection device, comprising:
a network interface that communicates with at least one of a first communication terminal, a second communication terminal, and one or more relay communication terminals that can be arranged between the first and second communication terminals; and
one or more processors connected to the network interface, the one or more processors performs the following:
receiving signal strength information indicating a signal strength between the second communication terminal and each of the first communication terminal and said one or more relay communication terminals;
receiving hop count information indicating a hop count for each of a plurality of possible communication paths that can be formed between the first communication terminal and the second communication terminal through said one or more relay communication terminals;

for each of the plurality of possible communication paths, determining whether or not a first stage signal strength that is defined as the signal strength between the second communication terminal and one of said one or more relay communication terminals that is directly communicating with the second communication terminal, as indicated by the received signal strength information, is greater than or equal to a first threshold value;

when the first stage signal strength in at least two of the plurality of possible communication paths is determined to be greater than or equal to the first threshold value, selecting, from among said at least two of the plurality of possible communication paths that have the first stage signal strength greater than or equal to the first threshold value, a communication path that has a smallest hop count, and, when the first stage signal strength in each of the plurality of possible communication paths is less than the first threshold value, selecting, from among the plurality of possible communication paths, a communication path that has the largest first stage signal strength; and causing the network interface to communicate with at least one of the first communication terminal, the second communication terminal, and one or more of the relay communication terminals that are on the selected communication path so as to establish the selected communication path between the first communication terminal and the second communication terminal.

2. The wireless connection device according to claim 1, wherein when the first stage signal strength is determined to be less than the first threshold value for all of the plurality of possible connection paths, said one or more processors determines whether the first stage signal strength is greater than or equal to a second threshold value which is less than the first threshold value for each of the plurality of possible connection paths, and selects a communication path, from among the plurality of possible connection paths, that has the largest first stage signal strength only when the largest first stage signal strength is greater than the second threshold value.

3. The wireless connection device according to claim 2, wherein in order to establish the selected communication path, said one or more processors causes the network interface to communicate with the second communication terminal such that the second communication terminal transmits a connection request to the first communication terminal or to the one or more of the relay communication terminals that are on the selected communication path, re-transmits the connection request if there is no response to the connection request within a prescribed period of time, and stops transmitting the connection request when a number of times the connection request has been transmitted and unanswered becomes greater than or equal to a prescribed number of times.

4. The wireless connection device according to claim 1, wherein in order to establish the selected communication path, said one or more processors causes the network interface to communicate with the second communication terminal such that the second communication terminal transmits a connection request to the first communication terminal or to the one or more of the relay communication terminals that are on the selected communication path, re-transmits the connection request if there is no response to the connection request within a prescribed period of time, and stops transmitting the connection request when a number of times the connection request has been transmitted and unanswered becomes greater than or equal to a prescribed number of times.

5. A wireless communication system, comprising:
the wireless connection device as set forth in claim 1 provided in at least one of the first communication terminal, the second communication terminal, and said one or more relay communication terminals, so as to establish a communication path among the first communication terminal, the second communication terminal, and said one or more relay communication terminals;
said first communication terminal;
said second communication terminal; and
said and one or more relay communication terminals,
wherein said first communication terminal, said second communication terminal, and said one or more relay communication terminals are located remotely from each other.

6. A wireless communication system, comprising:
the wireless connection device as set forth in claim 1 to establish a communication path among the first communication terminal, the second communication terminal, and said one or more relay communication terminals;
said first communication terminal;
said second communication terminal; and
said and one or more relay communication terminals,
wherein said first communication terminal, said second communication terminal, and said one or more relay communication terminals are located remotely from each other, at least one of said first communication terminal, said second communication terminal, and said one or more relay communication terminals is provided in a solar power system.

7. A wireless connection determination method to be performed by one or more processors in a wireless connection device having a network interface and said one or more processors, said network interface being configured to communicate with at least one of a first communication terminal, a second communication terminal, and one or more relay communication terminals that can be arranged between the first and second communication terminals, the method comprising causing said one or more processors to perform the following:

receiving signal strength information indicating a signal strength between the second communication terminal and each of the first communication terminal and said one or more relay communication terminals;

receiving hop count information indicating a hop count for each of a plurality of possible communication paths that can be formed between the first communication terminal and the second communication terminal through said one or more relay communication terminals;

for each of the plurality of possible communication paths, determining whether or not a first stage signal strength that is defined as the signal strength between the second communication terminal and one of said one or more relay communication terminals that is directly communicating with the second communication terminal, as indicated by the received signal strength information, is greater than or equal to a first threshold value;

when the first stage signal strength in at least two of the plurality of possible communication paths is determined to be greater than or equal to the first threshold value, selecting, from among said at least two of the plurality of possible communication paths that have the first stage signal strength greater than or equal to the first threshold value, a communication path that has a smallest hop count, and, when the first stage signal strength in each of the plurality of possible communication paths is less than the first threshold value, selecting, from among the plurality of possible communication paths, a communication path that has the largest first stage signal strength; and causing the network interface to communicate with at least one of the first communication terminal, the second communication terminal, and one or more of the relay communication terminals that are on the selected communication path so as to establish the selected communication path between the first communication terminal and the second communication terminal.

* * * * *